(12) United States Patent
Baek

(10) Patent No.: US 9,011,703 B2
(45) Date of Patent: Apr. 21, 2015

(54) METHOD FOR MANUFACTURING TOUCH SCREEN PANEL

(71) Applicant: Sang-Min Baek, Yongin (KR)

(72) Inventor: Sang-Min Baek, Yongin (KR)

(73) Assignee: Samsung Display Co., Ltd., Yongin, Gyunggi-Do (KR)

( * ) Notice: Subject to any disclaimer, the term of this patent is extended or adjusted under 35 U.S.C. 154(b) by 53 days.

(21) Appl. No.: 13/863,636

(22) Filed: Apr. 16, 2013

(65) Prior Publication Data

US 2014/0151325 A1 Jun. 5, 2014

(30) Foreign Application Priority Data

Nov. 30, 2012 (KR) .................. 10-2012-0138194

(51) Int. Cl.
*H01B 13/00* (2006.01)
*G06F 3/041* (2006.01)
*G06F 3/044* (2006.01)

(52) U.S. Cl.
CPC ............... *G06F 3/041* (2013.01); *G06F 3/044* (2013.01); *G06F 2203/04103* (2013.01)

(58) Field of Classification Search
USPC .......................................................... 216/13
See application file for complete search history.

(56) References Cited

U.S. PATENT DOCUMENTS

| | | | |
|---|---|---|---|
| 5,573,634 A | 11/1996 | Ham | |
| 2005/0090089 A1 | 4/2005 | Ma et al. | |
| 2009/0262096 A1* | 10/2009 | Teramoto | ...................... 345/174 |
| 2010/0040975 A1 | 2/2010 | Wada | |
| 2012/0113032 A1 | 5/2012 | Itakura et al. | |
| 2013/0050137 A1* | 2/2013 | Yang et al. | ..................... 345/174 |

FOREIGN PATENT DOCUMENTS

| | | |
|---|---|---|
| KR | 95-21087 | 2/1995 |
| KR | 10-2005-0038501 | 4/2005 |
| KR | 10-2009-0122196 | 11/2009 |
| KR | 10-2011-0044536 A | 4/2011 |
| KR | 10-2012-0048854 | 5/2012 |

* cited by examiner

*Primary Examiner* — Allan Olsen
*Assistant Examiner* — Margaret D Klunk
(74) *Attorney, Agent, or Firm* — Lee & Morse, P.C.

(57) ABSTRACT

A method for manufacturing a touch screen panel includes forming first and second conductive layers on a substrate, forming a photosensitive layer on the second conductive layer, exposing the photosensitive layer using a first mask having a first light shielding pattern that corresponds to sensing electrodes and lines to be formed, removing the photosensitive layer at the first exposed portion, sequentially removing the second and first conductive layers at the first exposed portion using the first remaining photosensitive layer as a mask, exposing the photosensitive layer using a second mask having a second light shielding pattern that corresponds to the lines to be formed, removing the photosensitive layer at the second exposed portion, removing the second conductive layer at the second exposed portion using the second remaining photosensitive layer as a mask, thereby forming the sensing electrodes and the lines, and removing the second remaining photosensitive layer.

8 Claims, 4 Drawing Sheets

METHOD FOR MANUFACTURING TOUCH SCREEN PANEL

CROSS-REFERENCE TO RELATED APPLICATION

This application claims priority under 35 U.S.C. §119 to Korean Patent Application No. 10-2012-0138194, filed on Nov. 30, 2012, in the Korean Intellectual Property Office, and entitled: "METHOD FOR MANUFACTURING TOUCH SCREEN PANEL," the entire contents of which is incorporated herein by reference.

BACKGROUND

1. Field

Embodiments relate to a method for manufacturing a touch screen panel.

2. Description of the Related Art

In recent years, touch screen panels have been applied to liquid crystal display devices (LCDs) and organic light emitting display devices (OLEDs). A touch screen panel is a device which allows a user to input a command by contacting the touch screen panel with an object such as a user's hand or pen. The touch screen panel recognizes a contact position by sensing a change in capacitance or voltage between two electrodes, and provides a user's command according to the contact position to a display device.

SUMMARY

Embodiments are directed to a method for manufacturing a touch screen panel, including forming a first conductive layer and a second conductive layer on a substrate, forming a photosensitive layer on the second conductive layer, exposing the photosensitive layer using a first mask having a first light shielding pattern that corresponds to a position of sensing electrodes and lines to be formed, the exposing providing a first exposed portion, removing the photosensitive layer at the first exposed portion, the removing providing a first remaining photosensitive layer, sequentially removing the second and first conductive layers at the first exposed portion, using the first remaining photosensitive layer as a mask, exposing the photosensitive layer using a second mask having a second light shielding pattern that corresponds to the position of the lines to be formed, the exposing providing a second exposed portion, removing the photosensitive layer at the second exposed portion, the removing providing a second remaining photosensitive layer, removing the second conductive layer at the second exposed portion, using the second remaining photosensitive layer as a mask, thereby forming the sensing electrodes and the lines, and removing the second remaining photosensitive layer.

The photosensitive layer may be a positive-type photosensitive layer.

The photosensitive layer may be a dry film photoresist (DFR).

The first conductive layer may be formed of a transparent material.

The transparent material may be one selected from the group of indium tin oxide (ITO), silver (Ag), nano-wire, graphene and a conductive polymer.

The second conductive layer may be formed of a material having a lower resistance than the first conductive layer.

The material having the lower resistance may be one selected from the group of molybdenum (Mo), silver (Ag), titanium (Ti), aluminum (Al), and copper (Cu).

The method may further include forming an insulation layer on the substrate including the sensing electrodes and the lines, patterning the insulation layer, thereby exposing side portions of sensing electrodes arranged in one direction, forming a third conductive layer on the insulation layer and the exposed sensing electrodes, and patterning the third conductive layer, thereby forming a bridge that connects adjacent ones of the sensing electrodes in the one direction to each other.

BRIEF DESCRIPTION OF THE DRAWINGS

The accompanying drawings, together with the specification, illustrate exemplary embodiments, and, together with the description, serve to explain the principles.

DETAILED DESCRIPTION

Figure 1:
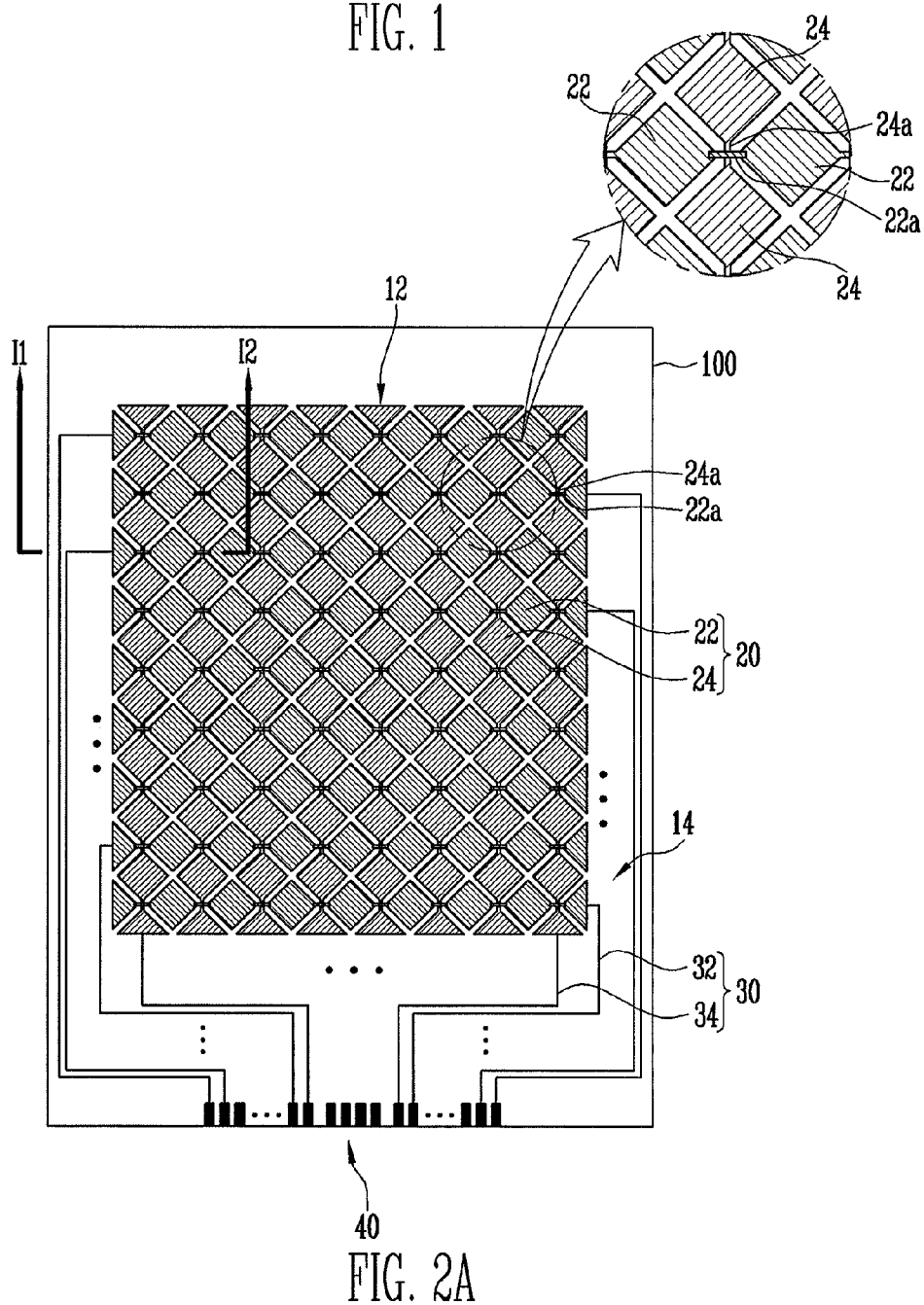
FIG. 1 is a schematic plan view illustrating a touch screen panel according to an embodiment.

Korean Patent Application No. 10-2012-0138194, filed on Nov. 30, 2012, in the Korean Intellectual Property Office, and entitled: "Method for manufacturing touch screen panel" is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is a schematic plan view illustrating a touch screen panel according to an embodiment.

Referring to FIG. 1, a substrate 100 includes a sensing area 12 and a peripheral area 14.

The substrate 100 may be a substrate made of a transparent insulator such as thin-film glass or plastic, or a flexible substrate.

The sensing area 12 is an area on which the contact position of a hand or object is sensed. The sensing area 12 may be disposed, for example, at a central portion of the substrate 100, and a plurality of sensing electrodes 20 are formed on the substrate 100. The plurality of sensing electrodes 20 include a plurality of first sensing patterns 22 arranged to be connected to one another along one direction (e.g., an X-direction), and a plurality of second sensing patterns 24 arranged to be connected to one another along a direction (e.g., a Y-direction) intersecting the first sensing patterns 22. The first and second sensing patterns 22 and 24 are preferably formed of a transparent conductive material.

Ones of the first sensing patterns 22 and the second sensing patterns 24 may be formed to be separated as individual patterns not connected to one another, and are connected to one another through bridges. For example, in a case where the second sensing patterns 24 are connected to one another by connecting portions 24a, the first sensing patterns 22 are formed to be separated from one another, and are connected to one another by bridges 22a. The bridge 22a is disposed to intersect the connecting portion 24a of the second sensing patterns 24, and is electrically insulated from the connecting portion 24a of the second sensing patterns 24 by an insulation layer (not shown).

The insulation layer is formed on the first sensing patterns 22, the second sensing patterns 24 and the connecting portions 24a, and is patterned so that both sides of the first sensing pattern 22 are exposed. The bridge 22a is disposed to intersect the connecting portion 24a on the insulation layer, and connects the exposed portions of the adjacent first sensing patterns 22 to each other.

The peripheral area 14 is a peripheral portion of the sensing area 12. A plurality of lines 30 connected to the plurality of sensing electrodes 20 and a pad portion 40 connected to the plurality of lines 30 are formed on the substrate 100. For example, lines 32 are formed to be connected to the plurality of first sensing patterns 22, and lines 34 are formed to be connected to the plurality of second sensing patterns 24. The lines 30 may be formed of a transparent conductive material or metal having low resistance, or may be formed into a stacked structure of the transparent conductive material and the metal.

A driving circuit board (not shown) for driving the touch screen panel is electrically connected to the pad portion 40.

FIGS. 2A to 2G are sectional views illustrating stages of a method for manufacturing a touch screen panel according to an embodiment. FIGS. 3A to 3F are plan views illustrating the method according to the embodiment. For convenience of illustration, there are shown sectional and plan views taken along line 11-12 of FIG. 1.

Figure 2A:
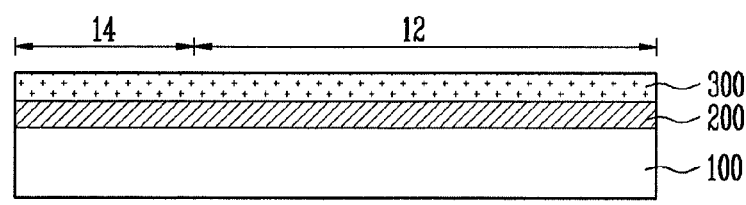
FIGS. 2A to 2G are sectional views illustrating stages of a method for manufacturing a touch screen panel according to an embodiment.

Referring to FIG. 2A, a first conductive layer 200 and a second conductive layer 300 are formed on a substrate 100.

The substrate 100 includes a sensing area 12 and a peripheral area 14. The first and second conductive layers 200 and 300 are formed on the substrate 100 including the sensing area 12 and the peripheral area 14.

The first conductive layer 200 is used to form sensing electrodes 20, and may be formed of a transparent material. The first conductive layer 200 may be formed of a material selected from the group consisting of indium tin oxide (ITO), silver (Ag), nano-wire, graphene, and conductive polymer. The second conductive layer 300 is used to form lines 30, and may be formed of a material having a lower resistance than the first conductive layer 200. The second conductive layer 300 may be formed of one selected from the group consisting of molybdenum (Mo), silver (Ag), titanium (Ti), aluminum (Al) and copper (Cu).

Figure 2B:

Referring to FIG. 2B, a photosensitive layer 400 is formed on the second conductive layer 200. The photosensitive layer 400 is exposed using a first mask 500 having a light shielding pattern 50 to correspond to the sensing electrodes 20 and the lines 30.

The photosensitive layer 400 may be formed by coating a liquid photosensitive photoresist, or may be a dry film photoresist (DFR). A positive-type photosensitive layer may be used as the photosensitive layer 400 so that the exposed portion of the photosensitive layer 400 can be removed through development. The first mask 500 may be made of a transparent material such as glass, and the light shielding pattern 50 may be formed of chromium (Cr), etc.

The DFR may be a film-shaped photosensitive layer. The DFR may be patterned by being pressed and adhered onto the second conductive layer 300 using a heated roller and then exposed with ultraviolet (UV), etc.

The other portions of the photosensitive layer 400, except regions in which the sensing electrodes 20 and the lines 30 are to be formed, are exposed through the exposure.

Figure 2C:
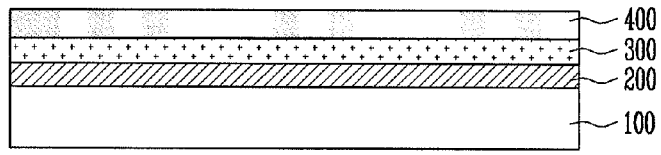
Figure 3A:
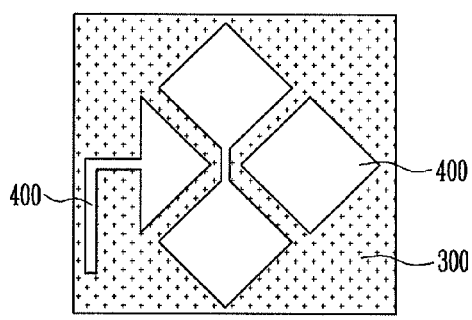
FIGS. 3A to 3F are plan views illustrating stages of the method according to the embodiment.
Figure 3B:
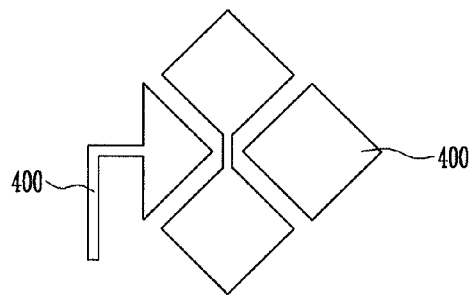

Referring to FIGS. 2C, 3A and 3B, the exposed portions of the photosensitive layer 400 are removed through a development process (see FIG. 3A). Then, the second and first conductive layers 300 and 200 at the exposed portions are sequentially removed through an etching process using the remaining photosensitive layer 400 as an etching mask (see FIG. 3B).

Figure 2D:
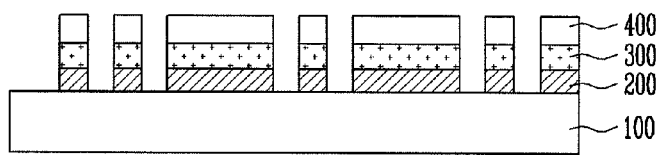

Referring to FIG. 2D, the photosensitive layer 400 is exposed using a second mask 200 having a light shielding pattern 60 to correspond to the lines 30.

The photosensitive layer 400 remaining at the other portion, except a region in which the lines 30 are to be formed through the exposure, i.e., the photosensitive layer 400 remaining on a region in which the sensing electrodes 20 are to be formed, is exposed.

In this embodiment, the positive-type photosensitive layer 400 is used, so that the portion of the photosensitive layer 400 that is not exposed in the exposure process using the first mask 500 can be exposed through the exposure process using the second mask 600.

Figure 2E:
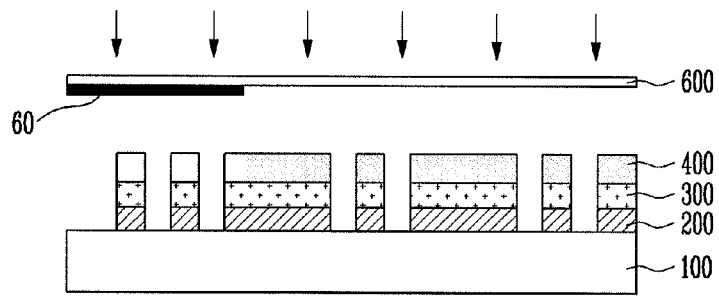
Figure 3C:
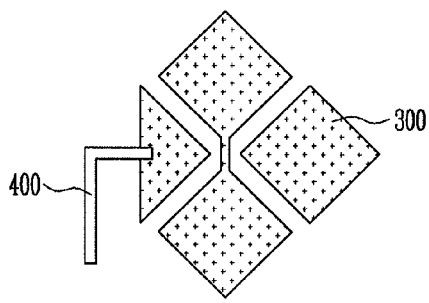

Referring to FIGS. 2E and 3C, the photosensitive layer 400 at the exposed portion is removed through a development process. The photosensitive layer 400 is removed, so that the second conductive layer 300 on the region in which the sensing electrodes 20 are to be formed is exposed.

Figure 2F:
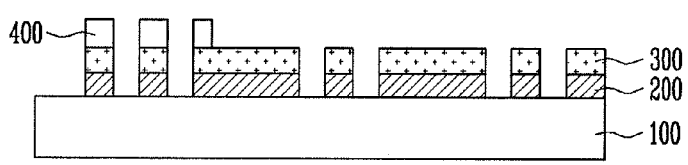
Figure 3D:
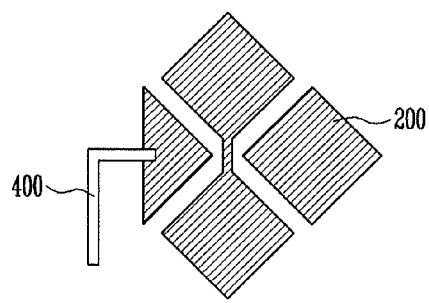
Figure 3E:
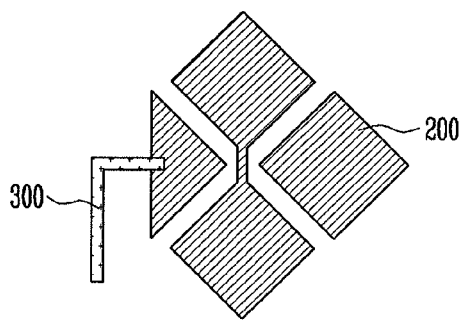

Referring to FIGS. 2F, 3D and 3E, the second conductive layer 300 at the exposed portion is removed through an etching process using the remaining photosensitive layer 400 as an etching mask (see FIG. 3D). Then, the remaining photosensitive layer 400 is removed (see FIG. 3E).

The sensing electrodes 20 are formed on the sensing area 12 through the etching process, and the lines 30 are formed on the peripheral area 14.

The sensing electrodes 20 are formed with the first conductive layer 200. The sensing electrodes 20 include a plurality of first sensing patterns 22 arranged to be separated from one another along one direction (e.g., an X-direction), and a plurality of second sensing patterns 24 arranged along a direction (e.g., a Y-direction) intersecting the first sensing patterns 22 and connected to one another by connecting portions 24a.

The lines 30 are formed into a stacked structure of the first and second conductive layers 200 and 300. The lines 30 include lines 32 connected to the plurality of first sensing patterns 22, and lines 34 (see FIG. 1) connected to the second sensing patterns 24.

Figure 2G:
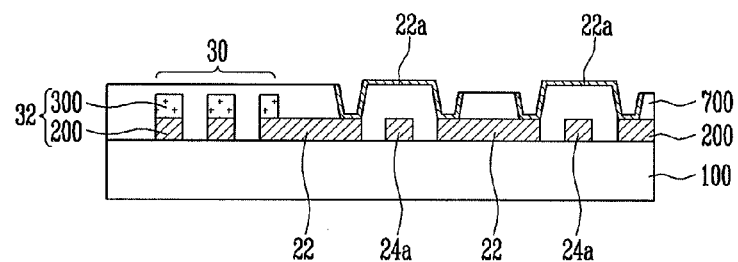
Figure 3F:
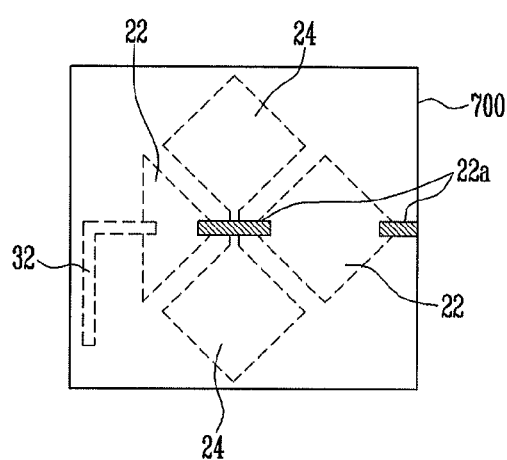

Referring to FIGS. 2G and 3F, an insulation layer 700 is formed on the substrate 100 including the sensing electrodes 20 and the lines 30, and both side portions of the sensing electrodes 20 arranged in one direction, e.g., both side portions of the first sensing patterns 22 are partially exposed. Subsequently, a third conductive layer is formed to a predetermined thickness on the insulation layer 700 and the exposed sensing electrodes 20, and then patterned, thereby forming bridges 22a so that the adjacent sensing electrodes 20 are connected to each other.

By way of summation and review, a touch screen panel generally includes two sensing electrodes for sensing a position at which a hand or object contacts the touch screen panel, and lines respectively connected to the two sensing electrodes. In order to manufacture the touch screen panel, masks may be used to form the sensing electrodes and the lines, and photo and etching processes are performed using the masks. The photo process includes a process of forming a photosensitive layer, a process of exposing the photosensitive layer using a mask, and a process of developing the exposed photosensitive layer.

A dry film photoresist may be used as the photosensitive layer in a photo process that requires high resolution and reliability. The dry film photoresist is formed in the shape of a film, and may be patterned by being pressed and adhered onto a conductive layer or insulation layer using a heated roller and then exposed and developed using ultraviolet (UV) radiation. After the conductive layer or insulation layer is etched using the dry film photoresist as a mask, the remaining dry film photoresist is stripped and removed.

The photo process may include several sub-processes, each using a different photoresist as a mask. Accordingly, the entire manufacturing process may be complicated when the photo process is added. Further, the photosensitive layer may be deformed by heat and pressure in the process of forming the photosensitive layer, and a contamination or defect of the photosensitive layer may be caused in the process of removing the photosensitive layer.

In contrast, embodiments provide a method for manufacturing a touch screen panel that may reduce the number of manufacturing processes. Embodiments also provide a method for manufacturing a touch screen panel, which can reduce a contamination or defect caused in a photo process. According to embodiments, a positive-type photosensitive layer is used, so that the portion of the photosensitive layer that is not exposed in an exposure process using a first mask can be exposed through an exposure process using a second mask. Thus, one photosensitive layer may be used as a mask for performing two etching processes. Accordingly, the number of photo processes may be reduced as compared with that of photo processes in other methods.

While embodiments have been described in connection with certain exemplary embodiments, it is to be understood that various modifications and equivalent arrangements are intended to be included within the spirit and scope of the appended claims, and equivalents thereof.

What is claimed is:

1. A method for manufacturing a touch screen panel, the method comprising:
    forming a first conductive layer and a second conductive layer on a substrate;
    forming a photosensitive layer on the second conductive layer;
    exposing the photosensitive layer using a first mask having a first light shielding pattern that corresponds to a position of sensing electrodes and lines to be formed, the exposing providing a first exposed portion;
    removing the photosensitive layer at the first exposed portion, the removing providing a first remaining photosensitive layer;
    sequentially removing the second and first conductive layers at the first exposed portion using the first remaining photosensitive layer as a mask;
    exposing the first remaining photosensitive layer using a second mask having a second light shielding pattern that corresponds to the position of the lines to be formed, the exposing providing a second exposed portion;
    removing the first remaining photosensitive layer at the second exposed portion, the removing providing a second remaining photosensitive layer;
    removing the second conductive layer at the second exposed portion using the second remaining photosensitive layer as a mask, thereby forming the sensing electrodes and the lines; and
    removing the second remaining photosensitive layer.

2. The method of claim 1, wherein the photosensitive layer is a positive-type photosensitive layer.

3. The method of claim 1, wherein the photosensitive layer is a dry film photoresist (DFR).

4. The method of claim 1, wherein the first conductive layer is formed of a transparent material.

5. The method of claim 4, wherein the transparent material is one selected from the group of indium tin oxide (ITO), silver (Ag), nano-wire, graphene and a conductive polymer.

6. The method of claim 1, wherein the second conductive layer is formed of a material having a lower resistance than the first conductive layer.

7. The method of claim 6, wherein the material having the lower resistance is one selected from the group of molybdenum (Mo), silver (Ag), titanium (Ti), aluminum (Al), and copper (Cu).

8. The method of claim 1, further comprising:
    forming an insulation layer on the substrate including the sensing electrodes and the lines;
    patterning the insulation layer, thereby exposing side portions of sensing electrodes arranged in one direction;
    forming a third conductive layer on the insulation layer and the exposed sensing electrodes; and
    patterning the third conductive layer, thereby forming a bridge that connects adjacent ones of the sensing electrodes in the one direction to each other.

* * * * *